Aug. 11, 1942.   C. D. WRIGHT   2,292,592

FISH FLY

Filed Nov. 18, 1940

INVENTOR
Charles D. Wright.
BY
Harness, Dickey & Pierce
ATTORNEYS.

Patented Aug. 11, 1942

2,292,592

UNITED STATES PATENT OFFICE 2,292,592

FISH FLY

Charles D. Wright, Pontiac, Mich.

Application November 18, 1940, Serial No. 366,050

3 Claims. (Cl. 43—48)

This invention relates to artificial fish bait of the fly type.

The principal objects of the invention are the provision of a more attractive and illusive fish bait which will be more effective in catching fish, especially perch, bluegill, bass, trout and other small fish; the provision of a more attractive and illusive fish bait which assumes and maintains its desired position at all times during use; the provision of a fish fly having a hook and a weight secured to the hook at the curved portion of said hook; the provision of a fish fly comprising a hook and means secured thereto so arranged as to cover a portion of said hook and resemble in appearance a fly, or other insect, bug, or similar natural fish food; the provision of a fish hook having the eye and bent out of line so as to produce a motion simulating the real-life motion of various flies and bugs; the provision of an inexpensive fish fly both resembling live fish food and simulating the real-life action of such natural fish food; and the provision of a fish fly of the type described that is simple in construction and economical to manufacture as well as lifelike in action, and which may be used effectively either for still fishing or for casting.

Other objects of the invention will become apparent from the following specification, the accompanying drawing, and the claims hereinafter set forth.

In the accompanying drawing, which illustrate the preferred embodiment of the present invention and in which like numerals refer to like parts throughout the several views.

Figure 1:
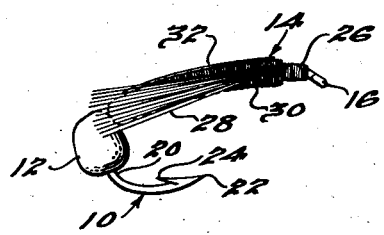
Figure 1 is an enlarged side elevational view of the preferred embodiment of the invention.
Figure 2:
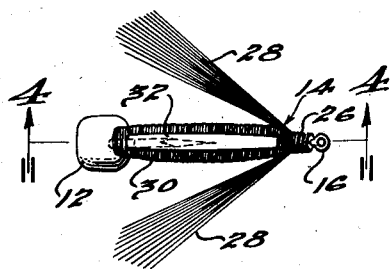
Fig. 2 is an enlarged plan view of the same embodiment.
Figure 3:
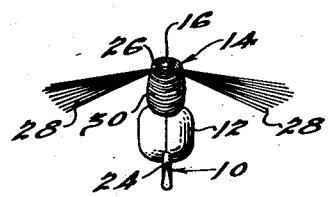
Fig. 3 is an enlarged front elevational view of the same embodiment.
Figure 4:
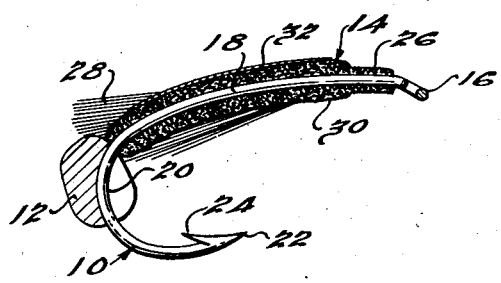
Fig. 4 is a cross-sectional view taken at line 4—4 of Figure 2.

Referring to the drawing, the fish fly comprises a fish hook 10, a weight 12 secured to said hook 10, and means simulating an insect or bug secured to said hook 10 and generally designated 14.

The hook 10 may be any conventional fish hook of the type described and comprises an eye 16, a shank portion 18 adjacent thereto which may be slightly curved, as shown, or may be substantially straight, a curved portion 20, a point 22 and a barb 24. The shank 18 is bent at a point adjacent the eye 16 so as to displace the eye 16 toward the point 22, which contributes to the irregular movement of the bait as it is pulled through the water.

The weight 12 may be of any suitable material heavier than water, but is preferably of lead. In the preferred embodiment illustrated in the drawing, the weight 12 is secured to the hook 10 by doubling it tightly about the curved portion 20 of the hook 10. However, it is obvious that the weight may be secured in any other manner or may be secured to the shank portion 18 of the hook 10. The weight 12 causes the bait to sink in the water, and, when properly disposed upon the hook, properly positions the bait during use.

The means 14 employed to simulate an insect or bug may vary in different baits as desired, and, of course, may or may not include representations of wings. In the means 14 illustrated, the insect is represented as headed toward the eye 16 of the hook 10; the eye 16, in fact, represents the head. Adjacent the eye 16, thread or cord 26 is wound about the shank 18 and simulates a portion of the body of the bug. This thread 26 also serves as a means of securing feathers 28, which represent wings and are disposed on both sides of the shank 18 at acute angles therewith and in a plane normal to that of the hook 10. Immediately adjacent said thread 26, yarn 30 is wound about said shank 18 to simulate the remainder of the body of the insect. In the embodiment illustrated, the yarn 30 covers the remainder of the shank portion 18 and the weight 12 is immediately adjacent one end of the yarn 30 and may be considered to represent a tail or an additional segment of body.

A strip of color may be added by placing a strip of some adhesive, self hardening material along the yarn 30, as the strip of sealing wax 32 which is placed along the back of the insect, being the side of yarn 30 away from the point 22 and barb 24 of the hook 10 in the embodiment illustrated. It is obvious, of course, that any color combination may be used, and, as a suitable illustration, in the embodiment described the yarn 30 is yellow and the sealing wax 32 is a reddish brown.

This fish bait is used in the same manner as other fishing flies, the line or leader being secured through the eye 16 of the hook 10. The weight 12, in holding the representation of the insect or bug in its proper position, also holds the hook 10 in a position in which any fish taking the insect will become hooked upon the barbed point 22 and 24. This bait may be used and maintains its proper position both in still fishing and casting.

Formal changes may be made in the specific embodiment of the invention described without departing from the spirit and substance of the invention, the scope of which is commensurate with the appended claims.

What is claimed is:

1. An artificial fish bait including a hook and a weight secured to said hook, said hook comprising a shank portion, an eye at one end of said shank portion, a curved portion at the other end of said shank portion, and a point at the end of said curved portion opposite to said shank portion, said weight being secured to said curved portion of said hook at a point contiguous to the juncture of said shank and curved portions, and feathers secured to said shank portion closely adjacent to said eye, said shank being wound with a strand to simulate the body of an insect or bug.

2. An artificial fish bait comprising a hook having a shank portion, an eye at one end of said shank portion, a curved portion at the other end of said shank portion, a point at the end of said curved portion opposite to said shank portion, a weight secured to said curved portion at a point contiguous to the juncture of said shank and curved portions, means simulating a fly, bug or insect secured to said shank portion, and feathers secured to said shank portion closely adjacent to said eye, said feathers extending out at an angle to said shank portion so as to leave the simulated fly, bug or insect body exposed to view.

3. An artificial fish bait comprising a hook having a shank portion, an eye at one end of said shank portion, a curved portion at the other end of said shank portion, a point at the end of said curved portion opposite to said shank portion, a weight secured to said curved portion at a point contiguous to the juncture of said shank and curved portions, means simulating a fly, bug or insect secured to said shank portion, and feathers secured to said shank portion closely adjacent to said eye, said feathers extending out at an angle to said shank portion so as to leave the simulated fly, bug or insect body exposed to view, and said eye being disposed at an angle to said shank and inclined toward said point so as to cause said bait to have an irregular motion when pulled through water.

CHARLES D. WRIGHT.